INVENTOR.
David L. Mullet
BY John A. Hamilton
Attorney.

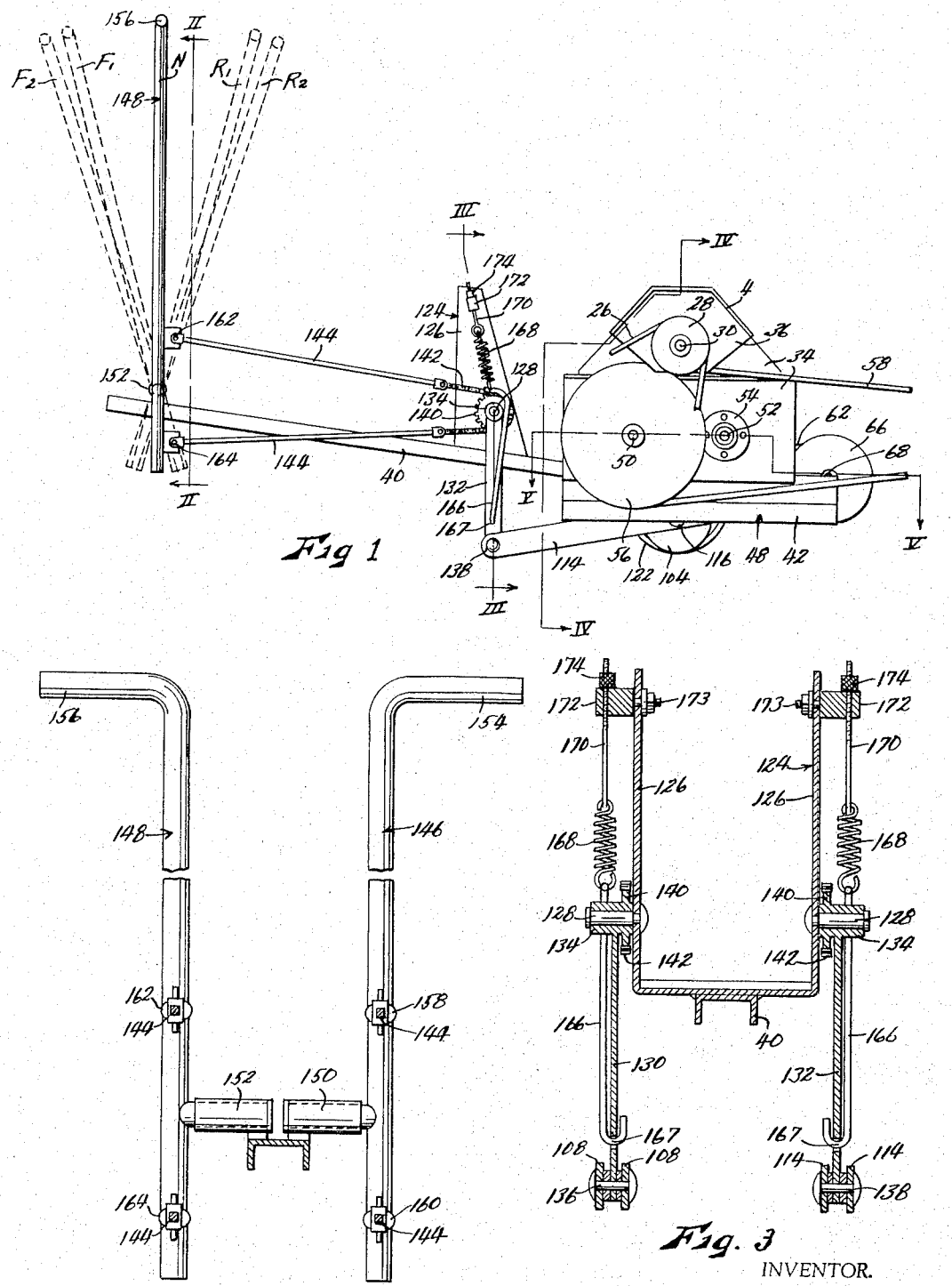

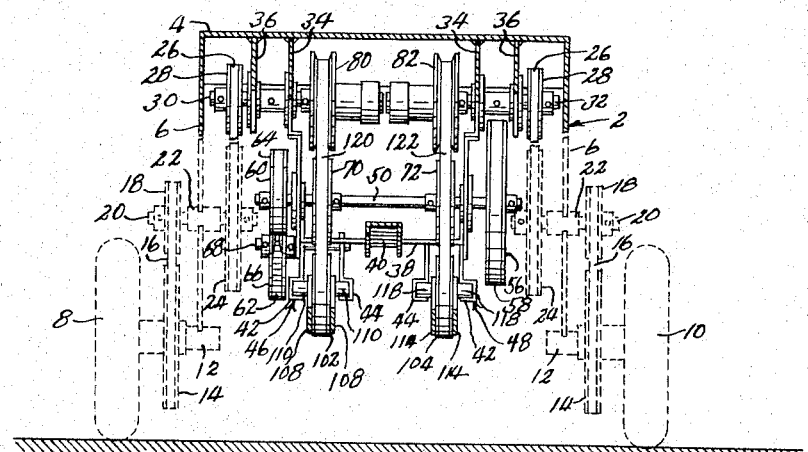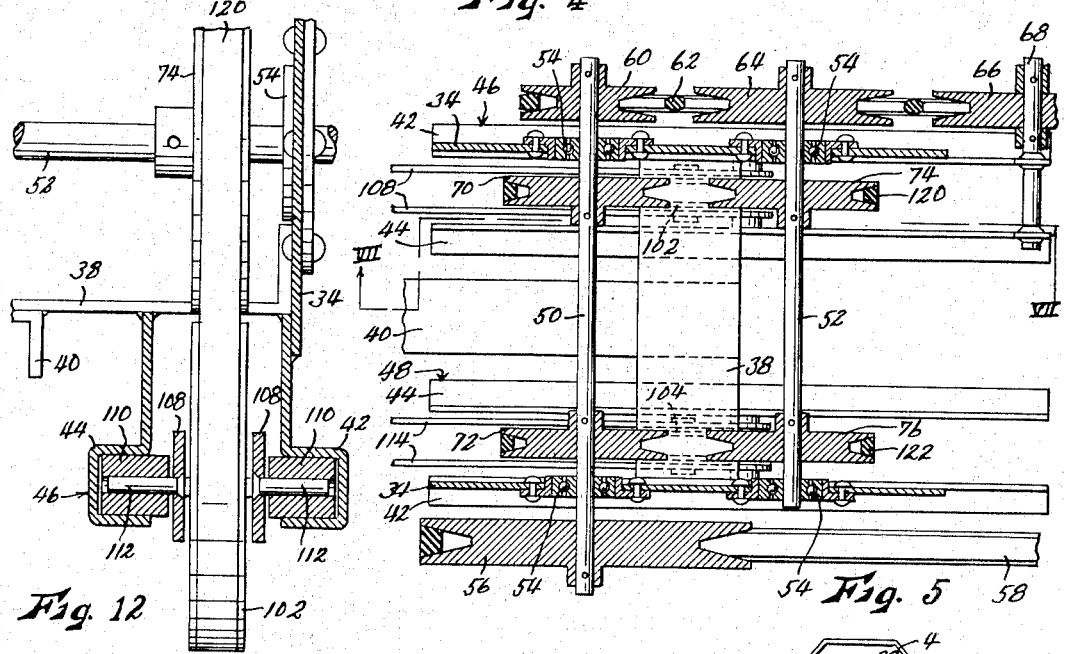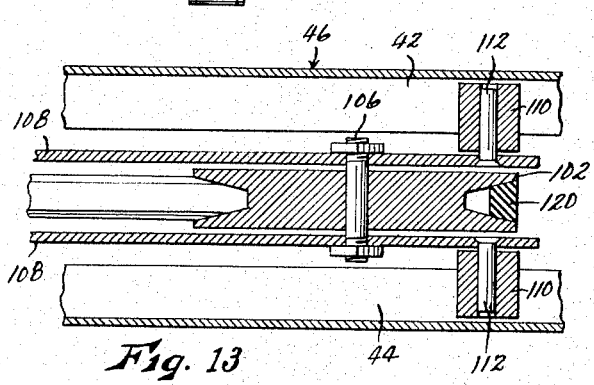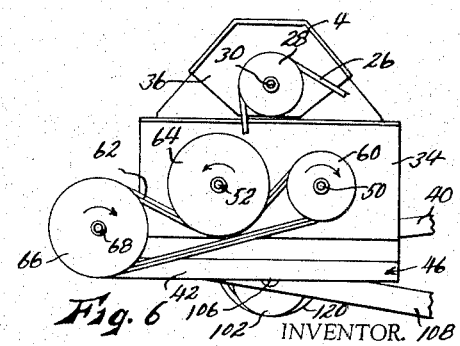
INVENTOR.
David L. Mullet
BY John A. Hamilton
Attorney.

Jan. 2, 1968  D. L. MULLET  3,360,999
POWER TRANSMISSION DEVICE
Filed Sept. 16, 1965  4 Sheets-Sheet 4
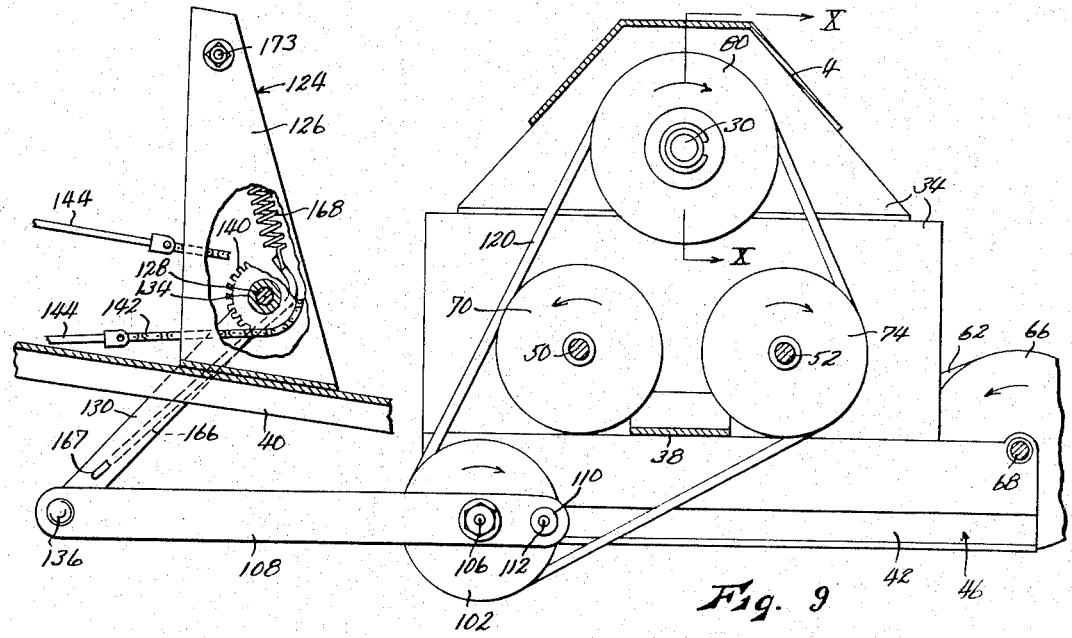
Fig. 9
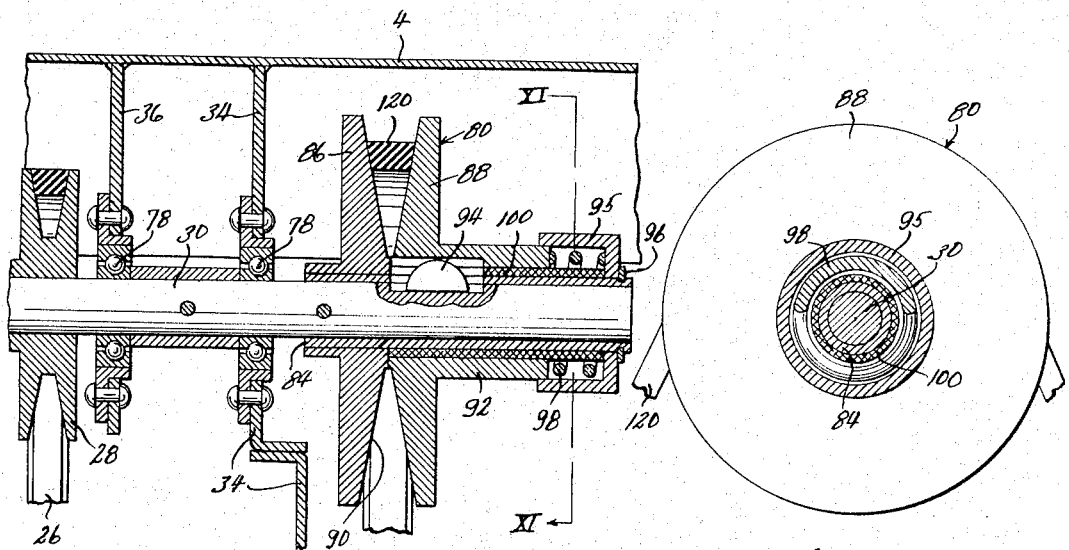
Fig. 10
Fig. 11
INVENTOR.
David L. Mullet
BY John A. Hamilton
Attorney.

United States Patent Office 3,360,999
Patented Jan. 2, 1968

3,360,999
POWER TRANSMISSION DEVICE
David L. Mullet, Hesston, Kans., assignor to Excel Industries, Inc., Hesston, Kans., a corporation of Kansas
Filed Sept. 16, 1965, Ser. No. 487,771
9 Claims. (Cl. 74—218)

ABSTRACT OF THE DISCLOSURE

This application discloses a power transmission device adapted to drive two transversely offset ground-engaging wheels of a vehicle independently and at variable speeds, whereby to start, stop, reverse and steer said vehicle. It includes a pair of power trains driven by a single prime mover and operable respectively to drive said wheels, each train having a pair of driving pulleys driven in opposite directions by the prime mover, a driven pulley of variable diameter biased yieldably toward its maximum diameter, and an idler pulley, all of said pulleys being coplanar, a belt trained about said pulleys, and means for moving said idler pulley in its plane to loosen said belt so that no drive occurs, or to move it selectively to a pair of drive positions to tension it about said driven pulley, idler pulley, and either of said drive pulleys, resilient means for holding said idler pulley in a drive position but not to decrease the diameter of said driven pulley against its biasing means, and manual means for moving said idler pulley past said drive position to cause said belt to reduce the diameter of said driven pulley.

---

Figure 7:
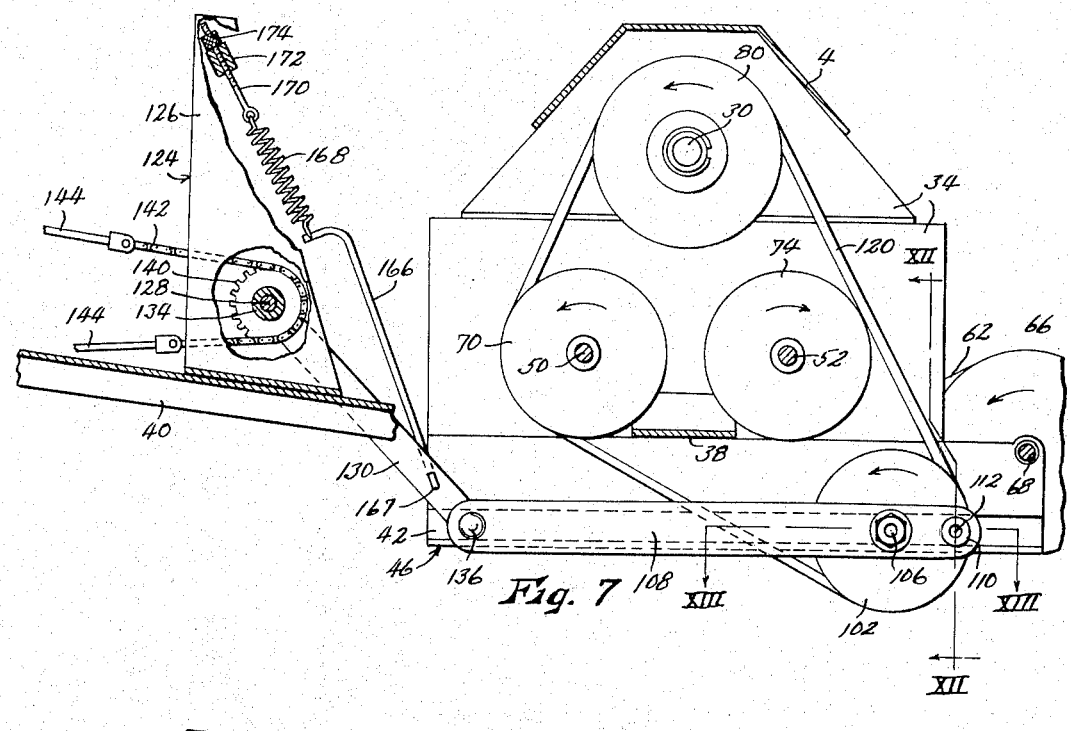

This invention relates to new and useful improvements in power transmission devices, and relates particularly to a power transmission device which, in an exemplary usage thereof, is adapted to be interposed between the prime mover and the ground-engaging drive wheels of a mobile vehicle whereby to provide for both forward and rearward travel of said vehicle, and additionally to provide for the primary steering of said vehicle. Generally, this object is accomplished by the provision of a power transmission which divides the power train from a single prime mover into two separate power trains interconnected respectively to a pair of ground engaging vehicle drive wheels which are transversely offset with respect to the direction of vehicle travel, the two separate power trains each being independently controllable by the operator to cause either forward or reverse rotation of the associated drive wheel, or to declutch said wheel entirely, as may be desired, it being understood that all other wheels supporting said vehicle are castered and free-rotating so as not in interfere with the control provided by said drive wheels.

Another object of the invention is the provision in a power transmission device of the character described, of means providing not only the primary steering function described above, but also a precision correctional steering function whereby minute variations may conveniently be made in the output speeds of the two separate power trains. Such correctional steering is useful, for example, in holding the vehicle to a straight line of travel despite variations in the power train speeds as provided by the primary steering means.

A further object is the provision of means whereby said precision correctional steering factor may be inserted and controlled by the same control members manipulated by the operator to control the primary steering means, as may be desirable for example when variation from straight-line travel may be caused by temporary factors such as operation of the vehicle on rough or sloping terrain, or may be inserted permanently, as may be desirable for example where variation from straight-line travel may be due to permanent factors such as manufacturing variations.

Still another object is the provision of manually operable control means for regulating the two separate power trains, said control means including dead center toggle mechanisms whereby each power train is automatically maintained in a forward driving position whenever the control means is moved manually to that position, so as not to require the continuous attention of and application of force by the operator, but which will also automatically maintain each power train in a neutral position, and return it from a reverse driving position to a neutral position, whenever the control means is released in either of the latter positions.

Other objects are simplicity and economy of construction, efficiency and dependability of operation, and adaptability for use whenever a power transmission having a pair of independently controllable outputs may be desired.

Figure 8:
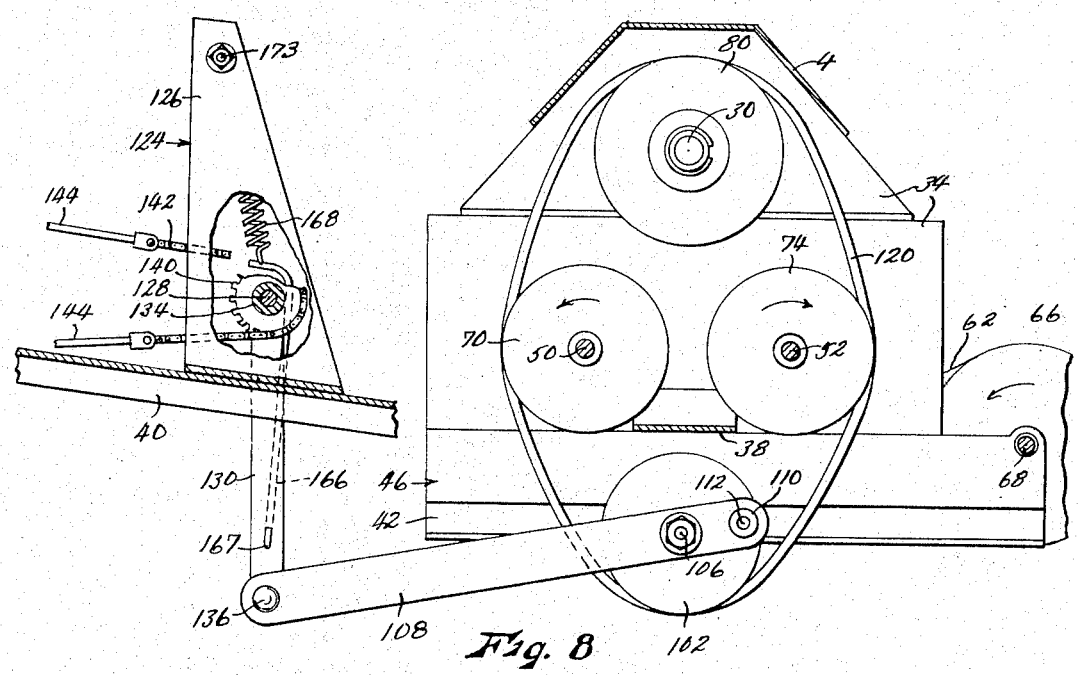

With these objects in view, as well as other objects, which will appear in the course of the specification, reference will be had to the accompanying drawing, wherein:

FIG. 1 is a left side elevational view of a power transmission device embodying the present invention, shown in its neutral position, and with various positions of the control levers indicated in dotted lines, FIG. 2 is an enlarged, foreshortened sectional view taken on line II—II of FIG. 1, FIG. 3 is an enlarged sectional view taken on line III—III of FIG. 1, FIG. 4 is a sectional view taken on line IV—IV of FIG. 1, including in dotted lines related portions of an exemplary vehicle which said power transmission device may be utilized to drive, FIG. 5 is an enlarged, fragmentary sectional view taken on line V—V of FIG. 1, FIG. 6 is a fragmentary right side elevational view of the power transmission device as shown in FIG. 1, FIG. 7 is a slightly irregular sectional view taken on line VII—VII of FIG. 5, showing the device in its forward driving position, with parts broken away, FIG. 8 is a view similar to FIG. 7, showing the device in its neutral position, FIG. 9 is a view similar to FIG. 7, showing the device in its reverse driving position, FIG. 10 is an enlarged fragmentary sectional view taken on line X—X of FIG. 9, FIG. 11 is a fragmentary sectional view taken on line XI—XI of FIG. 10, FIG. 12 is an enlarged fragmentary sectional view taken on line XII—XII of FIG. 7, and FIG. 13 is an enlarged fragmentary sectional view taken on line XIII—XIII of FIG. 7.

Like reference numerals apply to similar parts throughout the several views, and in FIG. 4 the mobile vehicle selected for illustration of an exemplary application of the power transmission device forming the subject matter of the present invention is shown diagrammatically simply as a frame 2 consisting of a top transverse cross bar 4 having a pair of spaced apart depending side walls 6 in which a pair of ground-engaging drive wheels 8 and 10 are respectively journalled in bearings 12 mounted in said side walls, it being understood that said drive wheels are transversely spaced apart with respect to the direction of travel of the vehicle. It will be further understood, though not illustrated, that all other ground-engaging wheels of the vehicle are castered and freely rotatable. Therefore, by turning drive wheels 8 and 10 in one direction or the other the vehicle may be driven forwardly or rearwardly, and by turning wheels 8 and 10 at relatively different speeds, the vehicle may be turned or steered. Fixed to each of the drive wheels 8 and 10 is a pulley 14 connected by belt 16 a smaller pulley 18 fixed on a shaft 20 journalled in a bearing 22 mounted in the associated side wall 6. A larger pulley 24 also fixed on shaft 20 is connected by belt 26 to a pulley 28, pulleys 28 being affixed respectively to the two aligned output or driven shafts 30 and 32 of the power transmission device forming the subject matter of the present invention, said power transmission device being disposed generally between side walls 6 of the vehicle frame. It will be seen in FIG. 4 that all parts of the vehicle and the power train for driving wheels 8 and 10 which are not directly connected with the power transmission device constituting the invention are, for clarity, shown in dotted lines.

The frame of the power transmission device includes cross bar 4, and additionally includes a pair of parallel, spaced apart side walls 34 affixed to and depending from said cross bar, and a second pair of abbreviated side walls 36 affixed to and depending from said cross bar respectively in outwardly spaced relation from said walls 34. Side walls 34 are rigidly connected adjacent their lower edges by a horizontal transverse cross bar 38, and a tongue 40 of channel form is affixed at its rearward end to the midpoint of cross bar 38 and extends well forwardly from side walls 34 as best shown in FIG. 1. Affixed respectively to the lower edge of each side wall 34 is an inwardly opening channel member 42 extending horizontally from front to rear, and each channel 42 is confronted by an outwardly facing channel 44, spaced inwardly therefrom and parallel thereto, channels 44 being affixed to frame cross bar 38. Each channel 42 and its associated channel 44 conjointly constitute a single track, the track at the right side, facing forwardly, being designated generally by the numeral 46, and the track at the left side being indicated generally by the numeral 48.

A pair of horizontal driving shafts 50 and 52 extend transversely in spaced apart relation between side walls 34, being journalled in bearings 54 mounted in said side walls (see FIG. 5) and extend outwardly from said side walls. Outwardly from left side wall 34, a pulley 56 (see FIG. 1) is affixed on shaft 50, and is adapted to be operably connected by belt 58 to an engine or other prime mover, not shown, also mounted on vehicle frame 2, whereby shaft 50 is driven continuously in one direction. Affixed on shaft 50 outwardly from right side wall 34 is a pulley 60 which is operably connected by belt 62 to a pulley 64 (see FIGS. 5 and 6) fixed on shaft 52 in coplanar relation to pulley 60, and to an idler pulley 66 journalled on a shaft 68 affixed to track 46 rearwardly of shaft 52. As will be seen in FIG. 6, belt 62 is trained about pulleys 60 and 64 in relatively opposite directions, whereby driving shaft 52 is caused to rotate in an opposite direction from driving shaft 50. Pulleys 60 and 64 may be of different diameters as shown in order that shafts 50 and 52 will rotate at different speeds. For example, since as will appear the vehicle is driven from shaft 50 when moving forwardly, and is driven from shaft 52 when moving rearwardly and since it is generally desirable that for safety the vehicle travel more slowly when moving rearwardly, pulley 64 may be larger than pulley 60, as shown, in order that shaft 52 will be driven at a slower rate than shaft 50. A pair of driving pulleys 70 and 72 are fixed on shaft 50 between side walls 34, and a pair of driving pulleys 74 and 76 are fixed on shaft 52 between side walls 34, all of said pulleys being of fixed and equal diameter, with pulleys 70 and 74 being disposed in the vertical plane of track 46, and pulleys 72 and 76 being disposed in the vertical plane of track 48.

Previously mentioned driven shafts 30 and 32 are disposed above, intermediate and parallel to driving shafts 50 and 52, and are axially aligned, shaft 30 being disposed at the right side and shaft 32 at the left side, each of said shafts being journalled in bearings 78 (see FIG. 10) mounted in the associated side walls 34 and 36. Pulley 28 for driving right wheel 8 is fixed on the outwardly extended end of shaft 30, and pulley 28 for driving left wheel 10 is fixed on the outwardly extended end of shaft 32. Between side walls 34, a pair of driven pulleys 80 and 82 are fixed respectively on shafts 30 and 32, pulley 80 lying in the vertical plane of track 46, and pulley 82 lying in the vertical plane of track 48. Pulleys 80 and 82 are of variable diameter, each consisting, as best shown in FIG. 10, of a sleeve 84 fixed on the associated shaft, a conical face plate 86 fixed on said sleeve, a movable conical face plate 88 confronting face plate 86 to form a tapered belt groove 90 therebetween, said movable face plate having a hub 92 slidably mounted on sleeve 84 but secured against rotation thereon by key 94, a cup-shaped cap member 95 secured on the outwardly extended end of sleeve 84 by a snap ring 96 and into which hub 92 slides as face plate 88 moves away from face plate 86, and a compression spring 98 interposed between hub 92 and cap 95 whereby to bias plate 88 toward plate 86 with substantial force. A sleeve 100 of lubricant-impregnated material may be interposed between sleeve 84 and hug 92 to promote smooth operation.

Disposed between the channels 42 and 44 of each of tracks 46 and 48 is an idler pulley, the pulley associated with track 46 being designated by the numeral 102, and the pulley associated with track 48 being designated by the numeral 104. Pulley 102 is journalled on a bolt 106 (see FIG. 13) extending between and mounted in a pair of elongated co-extensive bars 108, adjacent the rearward ends of said bars. A pair of rollers 110 are journalled rotatably respectively on a pair of pins 112 fixed respectively to bars 108 and extending transversely outwardly therefrom in axially aligned relation, said rollers being engaged respectively in the confronting channels 42 and 44 of track 46 for rolling movement therein. Bars 108 extend generally forwardly from pulley 102. Similarly, idler pulley 104 is controlled by a pair of bars 114 between which said pulley is journalled at 116 (see FIG. 1) and having mounted thereon rollers 118 (see FIG. 4) engaged in the confronting channels 42 and 44 of track 48. Also included are a pair of endless belts 120 and 122. Belts 122 is trained around idler pulley 102, driving pulleys 70 and 74, and driven pulley 80, all of which lie substantially in the same vertical plane, and belt 122 is trained around idler pulleys 104, driving pulleys 72 and 76, and driven pulley 82, all of which also lie substantially in the same vertical plane. It will be seen in FIG. 8 that when either of idler pulleys 102 or 104, say pulley 102, is disposed at about its midpoint of forward and rearward travel, directly beneath and between driving shafts 50 and 52, the corresponding belt 120 is slack on all of its associated pulleys, so that driven pulley 80 is not turned. When idler 102 is moved rearwardly, as in FIG. 7, belt 120 is drawn taut into engagement with pulleys 102, 70, and 80, so that driven pulley 80 is driven from shaft 50 to drive the vehicle forwardly. Belt 120 does not engage pulley 74 at this time.

When idler 102 is moved forwardly, as in FIG. 9, belt 120 is drawn taut into engagement with pulleys 102, 74, and 80, and out of engagement with pulley 70, whereby driven pulley 80 is driven from shaft 52 to move the vehicle rearwardly.

Just forwardly of side walls 34, a U-shaped bracket 124 having upstanding side walls 126 is rigidly affixed to tongue 40. Fixed in the lower portion of each of said side walls is a stub shaft 128, said stub shafts being axially aligned and extending horizontally and transversely. A right crank 130 and a left crank 132 are mounted respectively on said shafts, each of cranks having a hub 134 pivotally journalled on its associated stub shaft. Said cranks extend generally downwardly, and the free ends thereof are pivoted respectively to the forward ends of bars 108 and 114, as at 136 and 138. Each crank hub 134 has a sprocket wheel 140 formed integrally and concentrically therewith. A short sprocket chain 142 is trained about each of said sprocket wheels, and the rearward ends of a pair of connecting rods 144 are connected to the respective ends of said chain. Said connecting rods extend forwardly for operation by a right control lever 146 and a left control lever 148 mounted in side by side relation at the forward end of tongue 40, said levers being independently pivoted to said tongue on horizontal transverse axes, as at 150 and 152, for forward and rearward movement, being provided at their upper ends with handles 154 and 156 respectively for manipulation by the vehicle operator. The forward ends of connecting rods 144 associated with right crank 130 are pivoted to right lever 146 respectively above and below lever pivot 150, as at 158 and 160, and the forward ends of connecting rods 144 associated with left crank 132 are pivoted to left lever 148 respectively above and below lever pivot 152, as at 162 and 164.

Each of the control levers 146 and 148 has a central position as shown in solid lines in FIG. 1, and further designated by the letter N. In this position, each lever functions through the associated connecting rods 144, chain 142, sprocket 140, crank 130 or 132, and bar 108 or 114 to position the associated idler pulley 102 or 104 in its previously described neutral position as shown in FIG. 8, so that the transmission is effectively inoperative and the associated ground-engaging drive wheel 8 or 10 is not driven. If either of control levers 146 or 148 is moved forwardly, it will reach a position $F_1$, shown in dotted lines in FIG. 1 in which it functions through the same operating means to move the associated idler pulley 102 or 104 rearwardly to the previously described forward-drive position illustrated in FIG. 7, whereby the associated ground-engaging drive wheel is turned to move the vehicle forwardly. In this position the corresponding belt 120 or 122 is taut, but the associated driven pulley 80 or 82 is still "closed" to its maximum diameter by the tension of its biasing spring 98. If the control lever 146 or 148 is manually forced still farther forward, as to position $F_2$ in FIG. 1, the associated driving belt 120 or 122 is still further tensioned and expands the associated driven pulley 80 or 82 to a smaller diameter. Since the belt speeds remain constant except when altered by changing the speed of operation of the prime mover, this reduction of diameter causes an increase in the rotational speed of the driven pulley and the elements driven thereby. This may be termed an "overdrive" condition. Correspondingly, each of control levers 146 and 148 may be pivoted rearwardly either to an $R_1$ position as shown in FIG. 1, in which the corresponding idler pulley 102 or 104 is moved forwardly to the previously described rearward-drive position shown in FIG. 9, and in which the corresponding driven pulley 80 or 82 remains at maximum diameter, or further to an $R_2$ "overdrive" position in which the corresponding driven pulley 80 or 82 is reduced in diameter.

The movement of each of cranks 130 and 132 is further affected by a toggle mechanism including the crank itself and an angled link 166 pivoted at its lower end of the crank adjacent its free end at 167, extending upwardly past the rearward side of crank hub 134 and then angling forwardly, and a tension spring 168 pivoted at its lower end to the upper end of link 166, and at its upper end to a threaded screw 170. Said screw extends slidably through a block 172, and has an adjusting nut 174 threaded thereon above said block. Said block is pivotally mounted at the upper end of the associated bracket side wall 126 on an axis parallel to the crank axis as by bolt 173. By turning nuts 174 the tensions of springs 168 may be adjusted independently of each other.

When either crank is in its neutral position, as in FIGS. 1 and 8, the corresponding toggle mechanism just described is in a first dead center position, the axis of spring 168 lying in the plane of shafts 128 and bolts 173, link 166 abutting crank hub 134 and the lower pivot 167 of said link being disposed forwardly of said plane. This represents the position of shortest length of spring 168, and the crank cannot be turned in either direction without at least slightly elongating said spring, and thus represents a "dwell" position in which the cranks will remain unless forceably moved. As either crank is pivoted rearwardly toward its forward-drive position, it first elongates spring 168 slightly until the lower end pivot 167 of link 166 passes rearwardly through the plane of shafts 128 and bolts 173, and link 166 has moved out of engagement with hub 134. This represents a second dead center position. When the crank is moved slightly rearwardly from this dead center position, the toggle is "broken" and the tension of spring 168 then functions through link 166 to pull the crank to the forward-drive position of FIG. 7, and represented by position $F_1$ of control handle 146 or 148 in FIG. 1.

The tension of spring 168 is normally adjusted by means of nut 174 so that it will move and maintain the associated idler pulley to and in the forward-drive position represented by position $F_1$ of the control lever, but not to the forward overdrive position represented by position $F_2$ of the control lever. In other words, while spring 168 is sufficiently strong to maintain an adequate operating tension on the associated driving belt 120 or 122, it normally does not exert sufficient tension on the belt to cause reduction of diameter of the associated driven pulley 80 or 82 against its biasing spring 98. Stated in still another way, it may be stated that each spring 168 is normally "weaker" than the associated spring 98. Thus, if both of levers 146 and 148 are moved forwardly to their $F_1$ positions, both of ground-engaging wheels will normally be rotated at equal speeds to move the vehicle forwardly in a straight line of travel. Moreover, the control levers will automatically be retained in the $F_1$ positions by springs 168, so that the operator is not required to exert pressure thereon continuously, and may remove his hands therefrom.

However, for various reasons the vehicle may under these conditions not travel in a straight line, but curve or "drift" either to the right or left. If the reason for such drift is transient, such as unequal inflation of the tires of drive wheels 8 and 10, or because one of said drive wheels is on a hard surface and the other on a soft surface, or because the vehicle is being operated on transversely sloping ground at a given moment, the operator may correct the drift by pressing still further forwardly on the control lever 146 or 148 at the side toward which the vehicle is drifting. For example, if the vehicle is drifting to the right, the operator presses forwardly on right control lever 146, thus forcing it into an overdrive position $F_2$. This exerts additional tension on driving belt 120 to cause reduction of the diameter of driven pulley 80, whereby to increase the rotational speed thereof, and hence of right drive wheel 8, to correct the drift. If the cause for drifting from straight line travel is caused by manufacturing variations and are therefore permanent, as for example variations in the diameters of pulleys 70, 72, 74, 76, 80 and 82 or in the lengths of belts 120 and 122, it would be inconvenient for the operator to maintain the necessary added pressure on the proper control lever, and to maintain said added pressure constant, and would of course, require him to keep his hand continuously on said lever. In these circumstances, correction of the drift is preferably accomplished by adjusting the tension of springs 168. For example, if the vehicle has a permanent drift to the right, adjusting nut 174 of the spring 168 of the right crank 130 may be turned to increase the tension of said spring so that to an adjustably variable degree, it overcomes the biasing spring 98 of driven pulley 80, hence increasing the rotational speed of said driven pulley and hence of right drive wheel 8, whereby to correct the drift. In so doing, the $F_1$ position of the affected control lever, which is of course a "dwell" position in which it will remain until forcibly moved, is adjusted slightly forwardly. This type of adjustment could be made by the manufacturer, and would very seldom need to be performed by the operator.

When the control levers 146 and 148 are moved rearwardly from their neutral N positions to their $R_1$ and $R_2$ positions, the toggle springs 168 associated therewith are continuously elongated, so that they exert a continuous force tending to return said levers to their N positions, and will do so whenever said levers are released. Thus there is no "dwell" position for reverse drive, and the levers must be held in these positions at all times by manual force. However, this is not considered to be a disadvantage since the periods during which reverse drive of most vehicles is desirable are usually short and infrequent. The precision correctional steering provided by the overdrive positions $R_2$, however, is of course available in reverse as well as forward drive. Moreover, in moving from position $R_1$ to $R_2$, each control lever must overcome the additive total of the opposing tensions of the springs 168 and 98 associated therewith, while in forward-drive the two springs tend to counteract each other and the difference therebetween, representing the manual force required to move the levers from $F_1$ to $F_2$, may be very slight. This additive resistance of the two springs when moving from $R_1$ to $R_2$ in reverse-drive creates a definite "step" or sudden increase in resistance to movement of the levers. This "step" is readily perceived by the operator, and renders it easy for him to provide a normal rearward drive by pulling the control levers against these "steps," and to povide precision correctional steering in reverse by pulling said levers through or past said "steps."

The precision correctional steering provided by the "overdrive" operation described above is not ordinarily employed for obtaining major steering or sharp turning of the vehicle. Instead, said major steering is provided by returning one of control levers 146 or 148 to its neutral N position, thus causing the associated drive wheel 8 or 10 to cease rotation, while leaving the other control lever in a driving position to continue the rotation of the other drive wheel, or even by manipulation of the control levers to cause simultaneous opposite rotation of the two drive wheels. Extremely sharp turns may be negotiated in this manner. In fact, by turning wheels 8 and 10 at equal speeds but in opposite directions, the vehicle may be caused to reverse its direction of travel within its own horizontal span, by turning about a vertical axis bisecting the axis of wheels 8 and 10. In many types of operations, as for example when the vehicle carries or is part of a mowing machine which is used in successively opposite overlapping passes across a lawn or field, the extreme maneuverability and short turning radius provided by the present device are valuable advantages.

While I have shown and described a specific embodiment of my invention, it will be readily apparent that many minor changes of construction and operation could be made without departing from the spirit of the invention as defined by the scope of the appended claims.

What I claim as new and desire to protect by Letters Patent is:

1. In a power transmission device:
 (a) a frame,
 (b) a driving pulley carried rotatably by said frame,
 (c) means interconnecting said pulley to a prime mover whereby the former is driven by the latter,
 (d) a driven pulley of variable diameter carried rotatably by said frame and disposed in the plane of said driving pulley,
 (e) an idler pulley carried by said frame in the plane of said driving and driven pulleys, said idler pulley being rotatable about its axis and movable transversely to its axis in the plane of said pulleys,
 (f) a belt trained about said driving, driven and idler pulleys,
 (g) means biasing said driven pulley yieldably toward its maximum diameter, and
 (h) manually operable means carried by said frame for moving said idler pulley transversely to its axis from a neutral position in which said belt is slack and is not driven, to a driving position in which said belt is drawn taut on said pulleys and is driven by said driving pulley, but in which said driven pulley is maintained at its maximum diameter by said biasing means, and further to an overdrive position in which the tension of said belt overcomes said biasing means to reduce the effective diameter of said driven pulley, whereby to increase the speed of rotation of said driven pulley, said means for moving said idler pulley comprising a toggle linkage interconnecting said idler pulley and said frame and having a dead center position occurring intermediate the neutral and driving positions of said idler pulley, resilient means operable to urge said toggle linkage in either direction away from its dead center position, said last named resilient means normally exerting less tension on said belt through said idler pulley than is required to overcome the means biasing said driven pulley to its maximum diameter, and manually operable means for moving said toggle linkage across its dead center position.

2. The structure as recited in claim 1 with the addition of:
 (a) means for adjusting the tension of said last named resilient means whereby the tension exerted thereby on said belt through said idler pulley may be increased to such an extent that said belt will overcome, to an adjustably variable degree, the means biasing said driven pulley toward its maximum diameter whereby to cause a reduction of the diameter and an increase in the rotational speed of said driven pulley.

3. In a power transmission device:
 (a) a frame,
 (b) a driving pulley carried rotatably by said frame,
 (c) means interconnecting said pulley to a prime mover whereby the former is driven by the latter,
 (d) a driven pulley of variable diameter carried rotatably by said frame and disposed in the plane of said driving pulley,
 (e) an idler pulley carried by said frame in the plane of said driving and driven pulleys, said idler pulley being rotatable about its axis and movable transversely to its axis in the plane of said pulleys,
 (f) a belt trained about said driving, driven and idler pulleys,
 (g) means biasing said driven pulley yieldably toward its maximum diameter, and
 (h) manually operable means carried by said frame for moving said idler pulley transversely to its axis from a neutral position in which said belt is slack and is not driven, to a driving position in which said belt is drawn taut on said pulleys and is driven by said driving pulley, but in which said driven pulley is maintained at its maximum diameter by said biasing means, and further to an overdrive position in which the tension of said belt overcomes said biasing means to reduce the effective diameter of said driven pulley, whereby to increase the speed of rotation of said driven pulley, said means for moving said idler pulley comprising a bar rotatably connected at one end to said idler pulley and extending transversely therefrom, a crank rotatably mounted on said frame and having its outer end pivoted to the end of said bar opposite from said idler pulley, a link pivoted at one end to said crank in spaced apart relation from the axis thereof, a tension spring connected at one end to the free end of said link, means interconnecting the opposite end of said spring to said frame, said link and spring having a dead center position with respect to said crank when a plane including the end connections thereof traverse the axis of said crank, said dead center position occurring intermediate the neutral and driving positions of said idler pulley, stop means carried by said frame and operable to arrest movement of said link relative to said crank after movement of said link through said dead center position, in a direction causing movement of said idler pulley away from its driving position, and manually operable means for turning said crank.

4. The structure as recited in claim 3 with the addition of:
(a) means for adjusting the tension of said tension spring whereby the torque exerted on said crank by said spring and said link may be rendered selectively less or greater than is required to move said idler pulley through its driving position to an overdrive position against the means biasing said driven pulley toward its maximum diameter.

5. In a power transmission device:
(a) a frame,
(b) a pair of parallel driving shafts carried rotatably by said frame,
(c) means for interconnecting said driving shafts to a prime mover whereby said shafts are rotated in respectively opposite directions,
(d) a pair of driving pulleys fixed respectively on said two driving shafts,
(e) a driven shaft carried rotatably by said frame and parallel to but spaced apart from said driving shafts,
(f) a driven pulley fixed on said driven shaft and coplanar with said driving pulleys, said pulley being of variable diameter and having means biasing it yieldably toward its maximum diameter,
(g) an idler pulley carried by said frame in the plane of said driving and driven pulleys, said idler pulley being rotatable about its axis and movable transversely to its axis,
(h) a belt trained about said driving, driven and idler pulleys,
(i) manually operable means carried by said frame and operable to move said idler pulley transversely to its axis selectively in opposite directions from a neutral position in which said belt is slack and inoperative on said pulleys to either of a pair of drive positions, whereby when said idler pulley is moved to one of said drive positions said belt is drawn taut about said idler pulley, said driven pulley and one of said driving pulleys to drive said driven pulley in one direction, and whereby when said idler pulley is moved to the other of said drive positions said belt is drawn taut about said idler pulley, said driven pulley and the other of said driving pulleys to drive said driven pulley in the opposite direction, and
(j) means operable to vary the rotational speed of said driven pulley independently of the speed of travel of said belt, said means comprising means for moving said idler pulley selectively in either direction from neutral farther than the associated drive position to an overdrive position, wherein said belt reduces the diameter of said driven pulley against said biasing means, and the speed of said driven pulley is increased.

6. The structure as recited in claim 5 wherein said means for moving said idler pulley comprises:
(a) a toggle linkage interconnecting said idler pulley and said frame and having a dead center position intermediate the neutral and one of the driving positions of said idler pulley,
(b) resilient means operable to urge said toggle linkage in either direction away from its dead center position, to arrest movement of said toggle linkage in a position corresponding to the neutral position of said idler pulley and to yieldably resist movement of said idler pulley to the other of said driving positions, and
(c) manually operable means for moving said toggle linkage across its dead center position and to either limit of its travel.

7. The structure as recited in claim 6 with the addition of:
(a) means for adjusting the tension of said last named resilient means whereby the force exerted thereby tending to move said idler pulley toward said one driving position may be rendered selectively less or variably greater than the force required to move said idler pulley through said driving position to an associated overdrive position.

8. The structure as recited in claim 5 wherein said means for moving said idler pulley comprises:
(a) a bar pivotally connected at one end to said idler pulley and extending transversely therefrom,
(b) a crank pivotally mounted in said frame and having its outer end pivoted to the free end of said bar,
(c) a link pivoted to said crank adjacent the outer end thereof on an axis parallel to the crank axis,
(d) a tension spring connected at one end to the free end of said link and at its opposite end to said frame, said link and spring having a dead center position with respect to said crank when a plane including the end connections of said link and spring intersects the pivotal axis of the crank, and being operable to urge said crank in either direction from said dead center position, said dead center position occurring intermediate the neutral and one of the driving positions of said idler pulley,
(e) stop means carried by said frame and operable to arrest movement of said link relative to said crank when said crank is in a position corresponding to the neutral position of said idler pulley, whereby pivoting of said crank to move said idler pulley to the other of its driving positions is yieldably resisted by said spring, and
(f) manually operable means for turning said crank.

9. The structure as recited in claim 8 with the addition of:
(a) means for adjusting the tension of said spring whereby the force exerted thereby tending to turn said crank to move said idler pulley to said one driving position may be rendered selectively less than or variably greater than the force required to move said idler pulley through said one driving position to a corresponding overdrive position.

References Cited

UNITED STATES PATENTS 2,134,159  10/1938  Von Hofe _____ 74—230.17
2,648,359  8/1953   Barksdale _____ 74—218 X
2,799,175  7/1957   Peck _____ 74—218

FRED C. MATTERN, JR., *Primary Examiner.*

J. A. WONG, *Assistant Examiner.*